United States Patent
Lee et al.

(10) Patent No.: US 7,573,676 B2
(45) Date of Patent: Aug. 11, 2009

(54) MAGNETIC RECORDING HEAD HAVING A POLE STRUCTURE FORMED ON A SAME PLANE AS AND SURROUNDED BY A SHIELD FOR REDUCING AN ANTENNA EFFECT

(75) Inventors: Hoo-san Lee, Osan-si (KR); Young-hun Im, Suwon-si (KR); Yong-su Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 543 days.

(21) Appl. No.: 11/196,412

(22) Filed: Aug. 4, 2005

(65) Prior Publication Data

US 2006/0103977 A1    May 18, 2006

(30) Foreign Application Priority Data

Nov. 15, 2004    (KR) ............... 10-2004-0093001

(51) Int. Cl.
*G11B 5/17* (2006.01)
(52) U.S. Cl. .................. 360/123.12; 360/123.37; 360/123.58
(58) Field of Classification Search ............ 360/123.12, 360/123.37, 123.58, 128
See application file for complete search history.

(56) References Cited

U.S. PATENT DOCUMENTS

| | | | |
|---|---|---|---|
| 5,075,956 A * | 12/1991 | Das ................. | 29/603.14 |
| 6,954,340 B2 * | 10/2005 | Shukh et al. ............. | 360/317 |
| 7,196,871 B2 * | 3/2007 | Hsu et al. ............. | 360/125.03 |
| 7,212,367 B2 * | 5/2007 | Clinton et al. ............. | 360/55 |
| 7,248,431 B1 * | 7/2007 | Liu et al. ............. | 360/119.02 |

FOREIGN PATENT DOCUMENTS

| | | |
|---|---|---|
| EP | 0821348 A2 | 1/1998 |
| EP | 0821348 A3 | 3/1998 |
| JP | 2002-100006 A | 4/2002 |
| JP | 2002-197619 A | 7/2002 |
| JP | 2004-039148 A | 2/2004 |
| JP | 2004-127480 A | 4/2004 |
| JP | 2004185672 A | 7/2004 |

* cited by examiner

*Primary Examiner*—A. J. Heinz
(74) *Attorney, Agent, or Firm*—Sughrue Mion, PLLC

(57) ABSTRACT

A magnetic recording head includes a return pole, a writing pole spaced a predetermined distance from the return pole, an induction writing coil forming a magnetic field on the writing pole, and a writing pole shield formed on the same plane as the writing pole.

10 Claims, 5 Drawing Sheets

1

MAGNETIC RECORDING HEAD HAVING A POLE STRUCTURE FORMED ON A SAME PLANE AS AND SURROUNDED BY A SHIELD FOR REDUCING AN ANTENNA EFFECT

This application claims priority from Korean Patent Application No. 10-2004-0093001, filed on Nov. 15, 2004, in the Korean Intellectual Property Office, the disclosure of which is incorporated herein in its entirety by reference.

BACKGROUND OF THE INVENTION

1. Field of the Invention

The present invention relates to a magnetic recording head, and more particularly, to a magnetic recording head having a pole structure capable of reducing an antenna effect.

2. Description of the Related Art

Studies on a perpendicular magnetic recording method are being performed to increase a recording density in a magnetic information recording field. In the perpendicular magnetic recording method, magnetization is oriented perpendicular to a disk surface to increase the recording density, unlike in a general longitudinal magnetic recording method.

In the magnetic recording method, wrong information may be recorded in a recording medium or information previously recorded on the recording medium may be erased due to an antenna effect. The antenna effect is a phenomenon where an external magnetic field is introduced into a recording head and an undesired magnetic field concentrates on a specific part of the recording head, for example, on a leading end of the head. Such an external magnetic field is a stray field often generated in an actuator having a magnetic circuit and in a voice coil motor (VCM) for driving the actuator. In the perpendicular recording method that is very sensitive to an external magnetic field because a tip of the head is very small, such an antenna effect may become a serious problem.

Korean Patent Publication No. 10-2002-0041578 discloses a magnetic recording head structured to reduce an antenna effect. The disclosed magnetic recording head includes a magnetic shield layer having a leading end close to a surface of a recording medium. The magnetic shield layer disperses an external magnetic field introduced into the magnetic recording head to prevent the external magnetic field from concentrating on a writing pole and a return pole, thereby reducing an antenna effect. There are other conventional methods that reduce an antenna effect by removing the return pole or separating the writing pole from the return pole.

However, the conventional methods for reducing an antenna effect need to perform a process of forming an antenna effect reducing structure in addition to a head manufacturing process, thereby making the head manufacturing process complex and increasing the manufacturing time and cost thereof.

Furthermore, since the conventional methods only consider the influence of the external magnetic field on a writing part, they cannot reduce an antenna effect generated in a reading part.

SUMMARY OF THE INVENTION

The present invention provides a magnetic recording head having a pole structure capable of reducing an antenna effect without adding a separate process to a head manufacturing process.

The present invention also provides a magnetic recording head capable of reducing an antenna effect generated both in a writing part and in a reading part thereof.

According to an aspect of the present invention, there is provided a magnetic recording head comprising: a return pole; a writing pole spaced a predetermined distance from the return pole; an induction writing coil forming a magnetic field on the writing pole; and a writing pole shield formed on the same plane as the writing pole.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
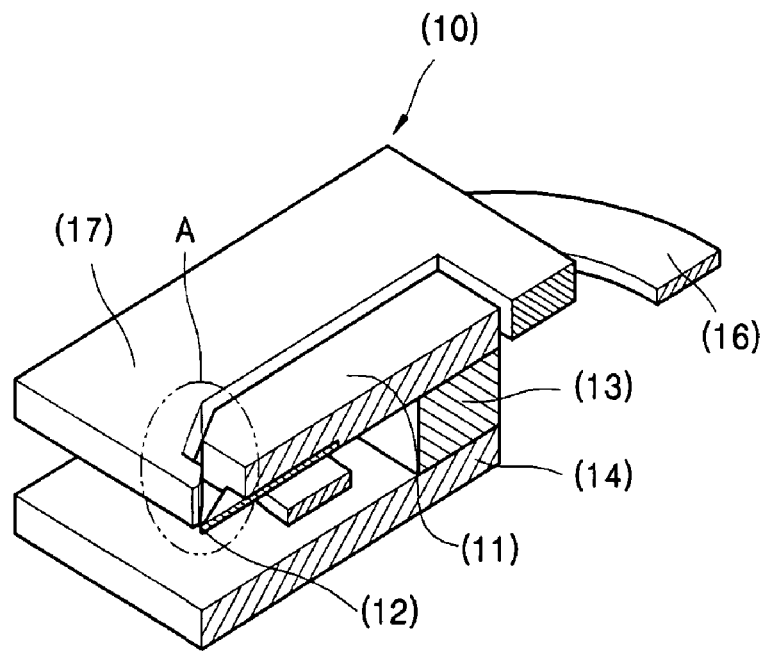
FIG. 1 is a perspective view of a magnetic recording head according to an exemplary embodiment of the present invention, illustrating a vertical section of a writing part of the magnetic recording head.

The present invention will now be described more fully with reference to the accompanying drawings, in which exemplary embodiments of the invention are shown. Although a perpendicular magnetic recording head is explained in the exemplary embodiments of the present invention, the present invention can also be applied to a longitudinal magnetic recording head. The same elements are given the same reference numerals throughout the drawings.

Figure 2:
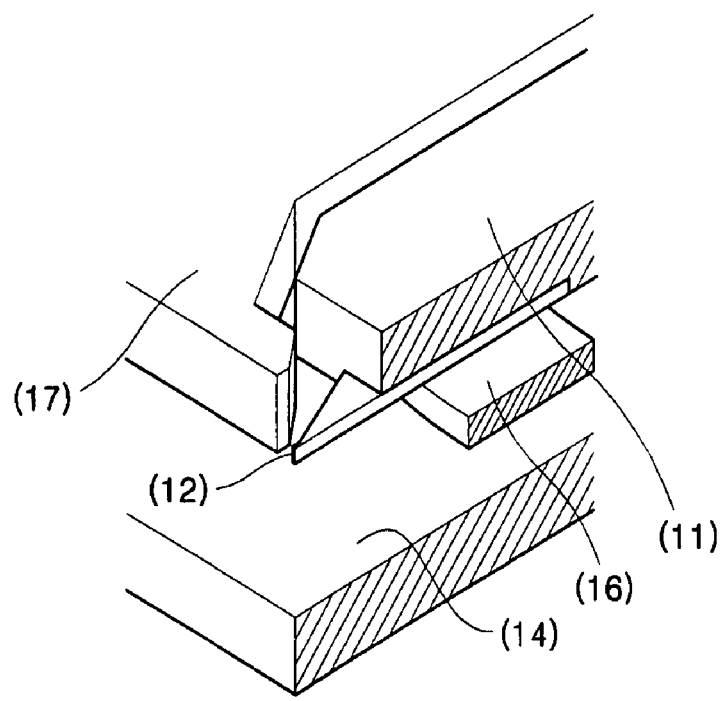
FIG. 2 is an enlarged view of portion A of FIG. 1.
Figure 3:
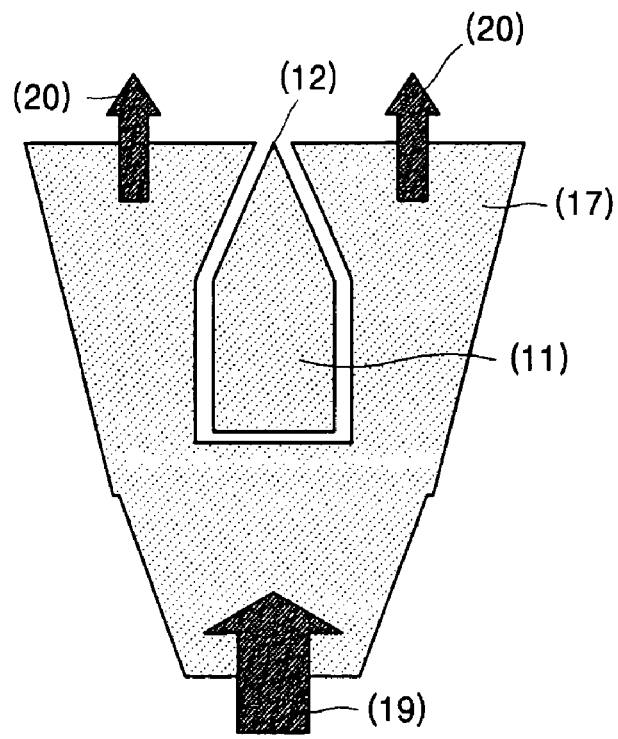
FIG. 3 is a schematic plan view of a writing pole and a writing pole shield of the magnetic recording head shown in FIG. 1.

FIG. 1 is a perspective view of a magnetic recording head according to an exemplary embodiment of the present invention, illustrating a vertical section of a writing part of the magnetic recording head. FIG. 2 is an enlarged view of portion A of FIG. 1. FIG. 3 is a schematic plan view of a writing pole and a writing pole shield of the magnetic recording head shown in FIG. 1.

Referring to FIGS. 1 through 3, a magnetic recording head 10 installed at a leading end of an actuator (not shown) writes and reads information by being moved to a desired position over a recording medium according to a pivoting motion of the actuator.

The magnetic recording head 10 includes a writing pole 11 for forming a leakage magnetic flux toward the recording medium, a return pole 14, and an induction writing coil 16 acting as a current supply route. In FIG. 3, reference numeral 19 denotes an external magnetic field, and reference numeral 20 is an external magnetic field dispersed and passing through a writing pole shield 17.

The return pole 14 is mechanically connected by a connecting part 13 to the writing pole 11 and is spaced a predetermined distance from the writing pole 11. The writing pole 11 forms the leakage magnetic flux through a leading end portion 12 and records information on an information storage medium (not shown) where a recording layer is formed on a soft magnetic layer.

Further, the magnetic recording head 10 includes the writing pole shield 17 formed on the same plane as the writing pole 11. The writing pole shield 17 disperses an external magnetic field to reduce an antenna effect generated in the writing pole 11. In detail, if an external magnetic field generated outside a hard disk drive (HDD) or generated in a VCM installed inside the HDD is transmitted to the magnetic recording head 10, the external magnetic field is dispersed to the writing pole shield 17 and the writing pole 11. Accordingly, the external magnetic field is prevented from concentrating on the writing pole 11, thereby reducing an antenna effect generated in the writing pole 11.

Since the writing pole shield 17 and the writing pole 11 are structurally separated by a predetermined distance from each other, most of the external magnetic field bypasses the writing pole 11 and goes to the writing pole shield 17, and only a small part of the magnetic field passes through the writing pole 11. Thus, the strength of the external magnetic field in the writing pole 11 is further weakened, thereby further reducing the antenna effect in the writing pole 11.

Here, it may be preferable that a cross-sectional area of the writing pole shield 17 is greater than a cross-sectional area of the writing pole 11 and the writing pole shield 17 be a magnetic body. In this case, the magnetic field dispersion of the writing pole shield 17 increases further, and thus the antenna effect in the writing pole 11 can be further reduced.

As described above, it may be preferable that the writing pole shield 17 is formed on the same plane as the writing pole 11 and be made of the same material as the writing pole 11. Accordingly, since the writing pole shield 17 can be manufactured at the same time as the writing pole 11, the antenna effect can be reduced without adding a separate process to a process of manufacturing the magnetic recording head 10.

In the meantime, according to the present exemplary embodiment, a return pole shield may be formed on the same plane as the return pole 14. Similar to the writing pole shield 17, the return pole shield disperses an external magnetic field transmitted to the return pole 14 to reduce an antenna effect in the return pole 14.

It may be preferable that the return pole shield is separated by a predetermined distance from the return pole 14. It may be preferable that a cross-sectional area of the return pole shield is greater than a cross-sectional area of the return pole 14, and the return pole shield is a magnetic body. The return pole shield can be manufactured at the same time as the return pole 14. The return pole shield may be made of the same material as the return pole 14.

Figure 4:
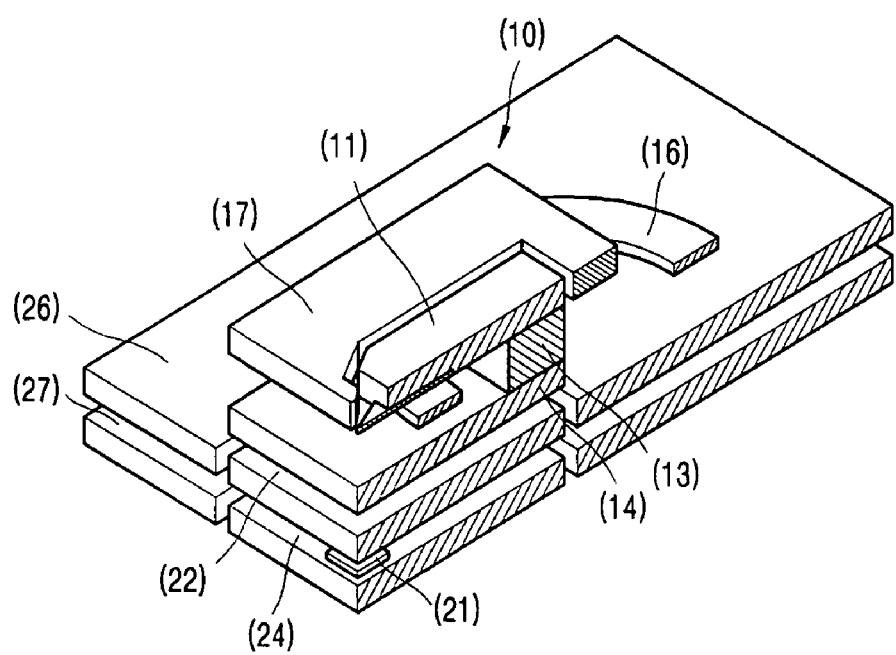
FIG. 4 is a perspective view of a magnetic recording head according to another exemplary embodiment of the present invention, illustrating vertical sections of a writing part and a reading part of the magnetic recording head.
Figure 5:
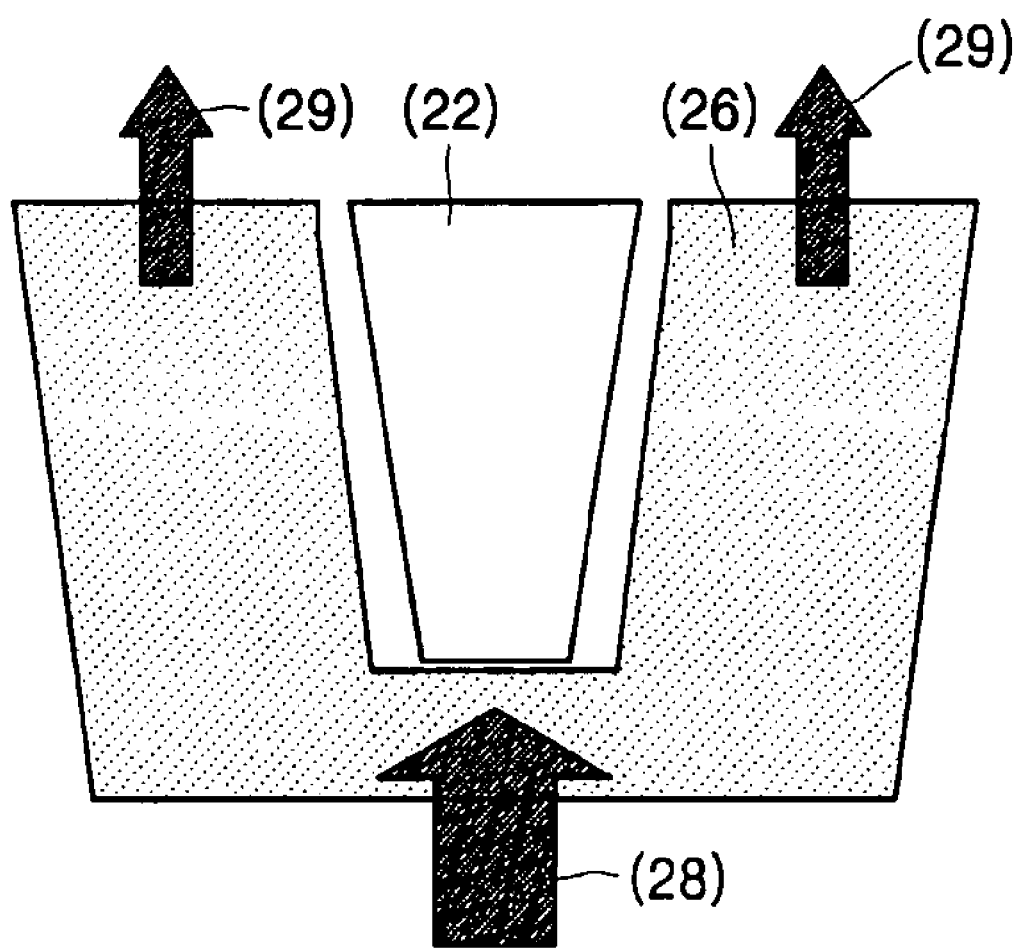
FIG. 5 is a schematic plan view of a top shield and a second top shield of the magnetic recording head shown in FIG. 4.

FIG. 4 is a perspective view of a magnetic recording head according to another exemplary embodiment of the present invention, illustrating vertical sections of a writing part and a reading part of the magnetic recording head. FIG. 5 is a schematic plan view of a top shield and a second top shield of the magnetic recording head shown in FIG. 4. Although the top shield and the bottom shield are shown in FIG. 5, a bottom shield and a second bottom shield have the same shape.

Referring to FIGS. 4 and 5, a magnetic recording head 10 includes a return pole 14, a writing pole 11, an induction writing coil 16, a reading sensor 21, a top shield 22, and a bottom shield 24. In FIG. 5, reference numeral 28 denotes an external magnetic field, and reference numeral 29 denotes an external magnetic field dispersed and passing through a second top shield 26.

The writing pole 11 is spaced a predetermined distance from the return pole 14, and the induction writing coil 16 induces a magnetic field to be formed in the writing pole 11. The reading sensor 21 is spaced a predetermined distance from the return pole 14 and reads information stored in a recording medium (not shown). The top shield 22 and the bottom shield 24 are spaced a predetermined distance respectively from top and bottom surfaces of the reading sensor 21. When the reading sensor 21 reads information, the reading sensor 21 does not affect other portions of the recording medium than portions to be read due to the top shield 22 and the bottom shield 24, thereby ensuring an accurate reading process.

In the present exemplary embodiment, the second top shield 26 may be disposed on the same plane as the top shield 22, or a second bottom shield 27 may be disposed on the same plane as the bottom shield 24. Alternatively, the second top shield 26 and the second bottom shield 27 may be respectively disposed on the top shield 22 and the bottom shield 24. Here, it may be preferable that a writing pole shield 17 is formed on the same plane as the writing pole 11.

As described above, the writing pole shield 17 disperses an external magnetic field to reduce an antenna effect in the writing pole 11. Similar to the writing pole shield 17, the second top shield 26 and/or the second bottom shield 26 disperse an external magnetic field transmitted to the top shield 22 and the bottom shield 24 to reduce an antenna effect in the top shield 22 and the bottom shield 24. In detail, if an external magnetic field generated outside an HDD or generated in a VCM installed inside the HDD is transmitted to the magnetic recording head 10, the external magnetic field is dispersed to the second top shield 26 and/or the second bottom shield 27 and to the top shield 22 and/or the bottom shield 24. Accordingly, the external magnetic field is prevented from concentrating on the top shield 22 and/or the bottom shield 24 to reduce an antenna effect generated in the top shield 22 and the bottom shield 24.

Here, since the second top shield 26 and/or the second bottom shield 27 and the top shield 22 and/or the bottom shield 24 are structurally separated by a predetermined distance from each other, most of the external magnetic field passes through the second top shield 26 and/or the second bottom shield 27 and a small part of the magnetic field passes through the top shield 22 and/or the bottom shield 24. Accordingly, the strength of the external magnetic field in the top shield 22 and/or the bottom shield 24 is further weakened, thereby further reducing the antenna effect.

Here, it may be preferable that cross-sectional areas of the second top shield 26 and the second bottom shield 27 are greater than cross-sectional areas of the top shield 22 and the bottom shield 24, respectively. It may be preferable that the second top shield 26 and the second bottom shield 27 are magnetic bodies. As described above, the second top shield 26 and the second bottom shield 27 are formed on the same planes as the top shield 22 and the bottom shield 24, respectively. It may be preferable that the second top shield 26 and the second bottom shield 27 are made of the same materials as the top shield 22 and the bottom shield 24. Accordingly, since the second top shield 26 and the second bottom shield 27 can be manufactured at the same time as the top shield 22 and the bottom shield 24, the antenna effect can be reduced without adding a separate process to a process of manufacturing the magnetic recording head 10. In this case, the magnetic dispersion of the second top shield 26 and the second bottom shield 27 increases further, and thus the antenna effect in the top shield 22 and the bottom shield 24 is further reduced.

Figure 6:
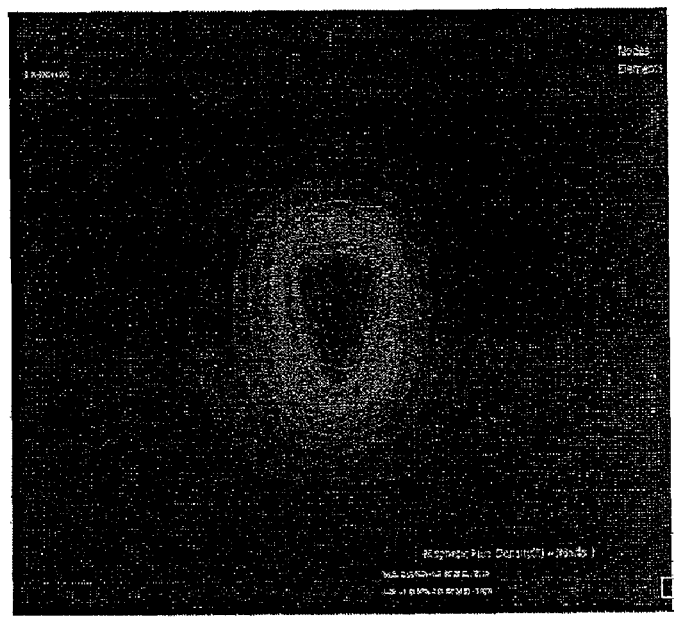
FIG. 6 is a simulation illustrating the distribution of a magnetic field at a writing pole of a conventional magnetic recording head due to an external magnetic field.
Figure 7:
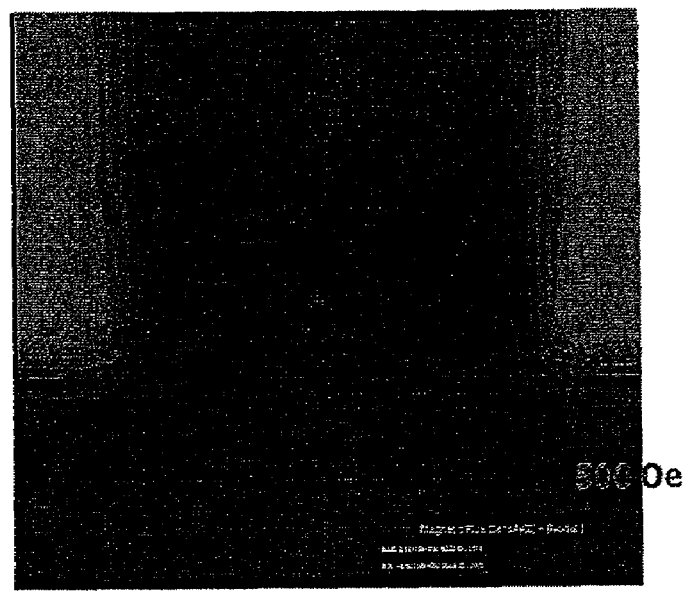
FIG. 7 shows a simulation result illustrating the distribution of a magnetic field at a writing pole of a magnetic recording head according to the present invention due to an external magnetic field.

FIG. 6 is a simulation illustrating the distribution of an external magnetic field of 40 Gauss at a writing pole of a conventional magnetic recording head. FIG. 7 is a simulation illustrating the distribution of an external magnetic field at a writing pole of a magnetic recording head according to the present invention.

Referring to FIG. 6, a magnetic field is formed around the writing pole of the conventional magnetic recording head due to the external magnetic field, and magnetic flux is greatly enhanced. The enhanced magnetic flux affects a storage medium to cause a previously recorded pattern to be erased or an undesired pattern to be recorded.

Referring to FIG. 7, a magnetic field is rarely formed around the writing pole of the magnetic recording head according to the present invention due to the external magnetic field. A weak magnetic field is formed around a writing pole shield. As described above, the external magnetic field is dispersed toward the writing pole and the writing pole shield, such that the external magnetic field rarely affects the writing pole and slightly affects the writing pole shield, thereby drastically reducing an antenna effect in the writing pole.

Figure 8:
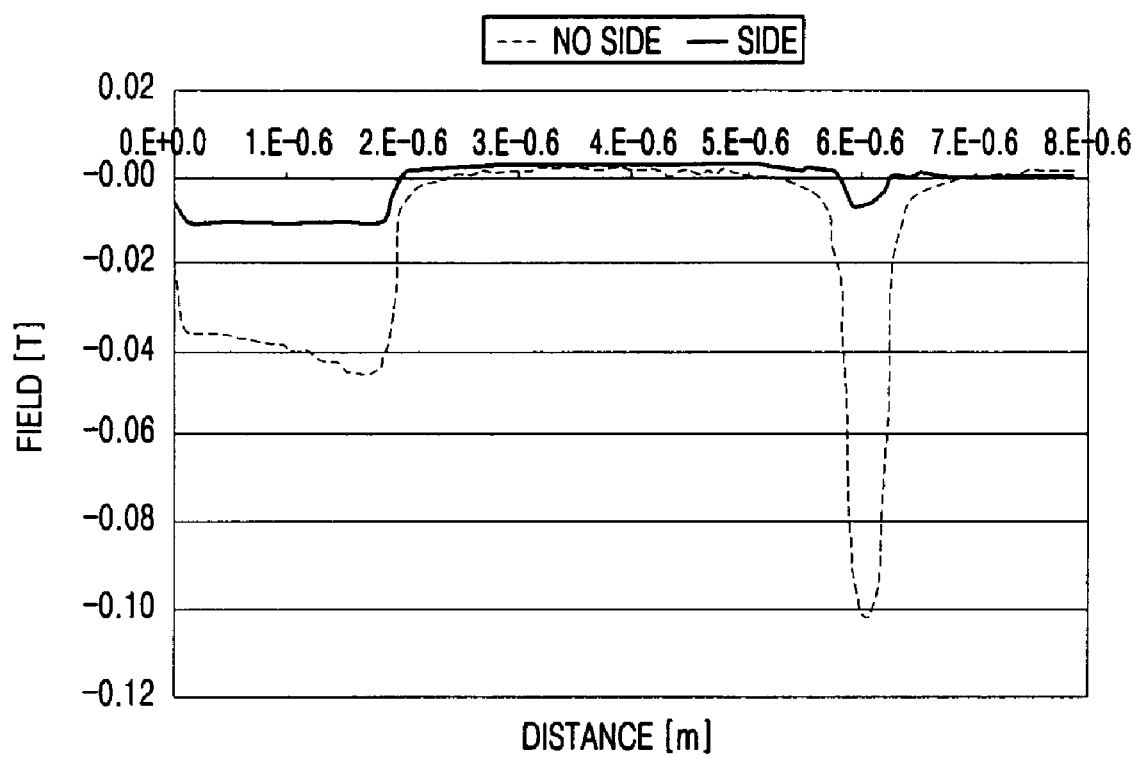
FIG. 8 is a graph comparing through an electromagnetic analysis magnetic fields generated in a track direction when an external magnetic field is applied to a conventional magnetic recording head and a magnetic recording head according to the present invention.

FIG. 8 is a graph for comparing through an electromagnetic analysis magnetic fields generated in a track direction when an external magnetic field is applied to a conventional magnetic recording head and a magnetic recording head according to the present invention. In the graph, "No Side" represents a graph for the conventional magnetic recording head, and "Side" represents a graph for the magnetic recording head according to the present invention. The horizontal axis of the graph denotes a distance of a leading end of the magnetic recording head that faces a magnetic disk, and the vertical axis of the graph denotes a strength of a magnetic field at the head corresponding to each distance. That is, a return pole is formed in an area of 0 to 3 μm, and a writing pole is formed in an area of 5.5 to 6.5 μm.

Referring to FIG. 8, the strength of the magnetic field at the return pole and the writing pole of the magnetic recording head according to the present invention is less than the strength of the magnetic field at the return pole and the writing pole of the conventional magnetic recording head. That is, since the magnetic recording head according to the present invention includes a writing pole shield formed on the same plane as the writing pole and a return pole shield formed on the same plane as the return pole to disperse an external magnetic field, it can reduce the antenna effect generated in the respective poles more than the conventional magnetic recording head can do.

Although FIGS. 6 and 8 illustrate results of tests performed on the writing pole, the same results can be obtained from the return pole and a reading pole.

In the magnetic recording head according to the present invention constructed as above, since the writing pole shield is formed on the same plane as the writing pole to disperse an external magnetic field, an antenna effect generated in the writing pole can be reduced.

Since the return pole shield is formed on the same plane as the return pole to disperse a magnetic field, an antenna effect generated in the return pole can be reduced.

Further, since the second top shield and/or the second bottom shield are formed on the same planes as the top shield and/or the bottom shield to disperse an external magnetic field, an antenna effect generated in the top shield and/or the bottom shield can be reduced.

In addition, since the writing pole shield, the return pole shield, the second top shield and/or the second bottom shield can be manufactured at the same time respectively as the writing pole, the return pole, the top shield and/or the bottom shield during a process of manufacturing the magnetic recording head, an antenna effect in each pole can be reduced without adding a separate process.

Moreover, since the magnetic recording head includes the writing pole shield, the second top shield, and/or the second bottom shield, an antenna effect generated in the top shield and/or the bottom shield as well as in the writing pole can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A magnetic recording head for recording information on an information storage medium comprising:
   a return pole;
   a writing pole spaced a first predetermined distance from the return pole, the writing pole comprising an end portion facing the information storage medium, a rear portion opposite to the end portion and two side surfaces connecting the end portion and the rear portion;
   an induction writing coil forming a magnetic field on the writing pole; and
   a writing pole shield formed on a same plane as the writing pole,
   wherein the writing pole shield surrounds the two side surfaces and the rear portion of the writing pole, and
   wherein the same plane is perpendicular to an air bearing surface (ABS).

2. The magnetic recording head of claim 1, wherein the magnetic recording head operates according to a perpendicular magnetic recording method.

3. The magnetic recording head of claim 1, wherein the writing pole shield is separated by a second predetermined distance from the writing pole.

4. The magnetic recording head of claim 1, wherein a cross-sectional area of the writing pole shield is greater than a cross-sectional area of the writing pole.

5. The magnetic recording head of claim 1, wherein the writing pole shield is a magnetic body.

6. The magnetic recording head of claim 1, wherein the writing pole shield is manufactured at a same time as the writing pole.

7. The magnetic recording head of claim 1, wherein the writing pole shield is made of a same material as the writing pole.

8. The magnetic recording head of claim 1, further comprising a return pole shield formed on a same plane as the return pole.

9. The magnetic recording head of claim 1, further comprising:
   a reading sensor spaced a predetermined distance from the return pole; and
   top and bottom shields spaced a second predetermined distance from top and bottom surfaces, respectively, of the reading sensor,
   wherein a second shield is formed on a same plane as at least one of the top shield and the bottom shield.

10. The magnetic recording head of claim 1, wherein a width of one end portion of the writing pole shield facing a magnetic recording media is larger than a width of the other end portion of the writing pole shield opposite to the one end portion.

* * * * *